United States Patent
He et al.

(10) Patent No.: US 9,258,805 B2
(45) Date of Patent: *Feb. 9, 2016

(54) HARQ/ACK CODEBOOK SIZE DETERMINATION

(71) Applicant: Intel Corporation, Santa Clara, CA (US)

(72) Inventors: Hong He, Beijing (CN); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,296

(22) Filed: Jun. 25, 2014

(65) Prior Publication Data

US 2014/0307596 A1 Oct. 16, 2014

Related U.S. Application Data

(63) Continuation of application No. 13/593,044, filed on Aug. 23, 2012, now Pat. No. 8,885,526.

(60) Provisional application No. 61/612,188, filed on Mar. 16, 2012.

(51) Int. Cl.
*H04W 72/04* (2009.01)
*H04L 5/14* (2006.01)
(Continued)

(52) U.S. Cl.
CPC ......... *H04W 72/0413* (2013.01); *H04L 1/1896* (2013.01); *H04L 5/0055* (2013.01);
(Continued)

(58) Field of Classification Search
None
See application file for complete search history.

(56) References Cited

U.S. PATENT DOCUMENTS

| 8,705,413 B2 | 4/2014 | Li et al. |
| 8,837,450 B2 | 9/2014 | Papasakellariou et al. |

(Continued)

FOREIGN PATENT DOCUMENTS

| CN | 101350936 A | 1/2009 |
| CN | 101874377 A | 10/2010 |

(Continued)

OTHER PUBLICATIONS

Office Action issued May 27, 2014 from Swedish Application No. 1350307-3.

(Continued)

*Primary Examiner* — Hassan Kizou
*Assistant Examiner* — Tejis Daya
(74) *Attorney, Agent, or Firm* — Schwabe, Williamson & Wyatt, P.C.

(57) ABSTRACT

Devices, methods, computer-readable media, and systems configurations for determining a hybrid automatic repeat request (HARQ)-acknowledgment (ACK) codebook in wireless communication networks. A user equipment (UE) may communicate with a plurality of serving cells, wherein at least two of the serving cells include different time division duplexing (TDD) uplink-downlink (UL-DL) configurations. The UE may determine a value based on a downlink assignment index (DAI), and determine a number of downlink subframes or special subframes that are included in a bundling window associated with an uplink subframe. Further, the UE may select the lesser of the determined value or the determined number of downlink subframes or special subframes included in the bundling window to correspond to a number of subframes for which the UE needs to feedback HARQ-ACK bits for the first serving cell.

25 Claims, 5 Drawing Sheets

(51) Int. Cl.

| | | |
|---|---|---|
| *H04W 24/02* | (2009.01) | |
| *H04N 21/414* | (2011.01) | |
| *H04N 21/6408* | (2011.01) | |
| *H04W 4/06* | (2009.01) | |
| *H04L 5/00* | (2006.01) | |
| *H04L 1/18* | (2006.01) | |
| *H04W 52/02* | (2009.01) | |
| *H04W 52/14* | (2009.01) | |

(52) U.S. Cl.
CPC ........ *H04L5/1438* (2013.01); *H04N 21/41407* (2013.01); *H04N 21/6408* (2013.01); *H04W 4/06* (2013.01); *H04W 24/02* (2013.01); *H04W 52/0206* (2013.01); *H04W 52/0235* (2013.01); *H04W 52/0229* (2013.01); *H04W 52/143* (2013.01); *Y02B 60/50* (2013.01)

(56) References Cited

U.S. PATENT DOCUMENTS

| | | | |
|---|---|---|---|
| 8,942,142 B2* | 1/2015 | Lin | 370/280 |
| 8,982,743 B2* | 3/2015 | Luo et al. | 370/281 |
| 2009/0245284 A1* | 10/2009 | Xu et al. | 370/474 |
| 2010/0074208 A1 | 3/2010 | Farajidana et al. | |
| 2010/0210256 A1 | 8/2010 | Shen et al. | |
| 2010/0299702 A1 | 11/2010 | Lo et al. | |
| 2011/0116457 A1* | 5/2011 | Damnjanovic et al. | 370/329 |
| 2011/0243012 A1 | 10/2011 | Luo et al. | |
| 2012/0039279 A1* | 2/2012 | Chen et al. | 370/329 |
| 2012/0082079 A1 | 4/2012 | Luo et al. | |
| 2012/0281601 A1 | 11/2012 | Kuo et al. | |
| 2013/0051288 A1* | 2/2013 | Yamada et al. | 370/280 |
| 2013/0322358 A1 | 12/2013 | He et al. | |
| 2014/0010128 A1 | 1/2014 | He et al. | |

FOREIGN PATENT DOCUMENTS

| | | |
|---|---|---|
| TW | I349457 A | 9/2011 |
| TW | I351233 A | 10/2011 |
| TW | I351846 A | 11/2011 |
| TW | I351853 A | 11/2011 |
| WO | WO2010/112963 A1 | 10/2010 |
| WO | WO2012024331 A1 | 2/2012 |
| WO | WO2013/043023 A2 | 3/2013 |

OTHER PUBLICATIONS

Intel Corporation, "Discussion on HARQ feedback of TDD Inter-band Carrier Aggregation," 3GPP TSG-RAN WG1 #67, R1-113951, Agenda Item: 7.2.1.5, Nov. 14-18, 2011, San Francisco, 6 pages.
Office Action issued Sep. 29, 2014 from Taiwan Application No. 102104851.
Office Action issued Sep. 23, 2014 from Spanish Application No. P201330358.
3GPP TS 36.213 VIO.5.0, 3GPP; TSGRAN; E-UTRA; Physical layer procedures (Release 10) pp. 68-73,84,85,104-106.
Mediatek Inc., 'Discussion on HARQ feedback mechanism and cross-carrier scheduling in inter-band CA with different TDD UL-DL configurations', RI-113864.3GPP TSG RAN WG 1 #67, San Francisco, USA, pp. 1-6; figs. 3-5.
Notification Concerning Transmittal of International Preliminary Report on Patentability mailed on May 15, 2014 from International Application No. PCT/US2012/031040.
Search Report issued Sep. 25, 2014 from Belgium Patent Application No. 2013/0171.
Lge, et al., "Correction for ACK/NACK related procedure in case of TDD UL-DL configuration 0," 3GPP TSG-RAN WG1 Meeting #68, R1-120937, Feb. 6-10, 2012, Dresden, Germany, 10 pages.
Panasonic et al., "Correction to definition of DAI(k)," 3GPP TSG-RAN WG1 Meeting #67, R1-114457, Nov. 14-18, 2011, San Francisco, CA, USA, 8 pages.
Pantech, "Remaining details on HARQ-ACK transmission for TDD CA with different TDD UL-DL configuration," Agenda Item: 7.2.3, 3GPP TSG RAN1 #70, R1-123322, Aug. 13-Aug. 17, 2012, Qingdao, China, 8 pages.
Catt, "UCI transmission on PUSCH in Rel-10," 3GPP TSG RAN WG1 Meeting #63bis, R1-110041, Jan. 17-21, 2011, Dublin, Ireland, 3 pages.
Office Action issued Nov. 28, 2014 from Dutch Application No. 2010449.
3GPP, "Correction for ACK/NACK related procedure in case of TDD UL-DL configuration 0", 3GPP TSG-RAN WG1 Meeting #68, Dresden, Germany, Feb. 6-10, 2012 (9 pages).
3GPP, "Correction to definition of DAI(k)", 3GPP TSG-RAN WG1 Meeting #67, San Francisco, CA Nov. 14-18, 2011(7 pages).
3GPP, "Remaining details on HARQ-ACK transmission for TDD CA with different TDD UL-DL configuration"; 3GPP TSG RAN1 #70, Qingdao, China, Aug. 13-17, 2012 (8 pages).
3GPP, "UCI transmission on PUSCH in REL-10"; 3GPP TSG RAN WG1 Meeting #63bis, Dublin, Ireland, Jan. 17-21, 2011 (3 pages).
Office Action issued Jul. 18, 2013 from French Application No. 1352323.
3GPP, "Evolved Universal Terrestrial Radio Access (E-UTRA); Multiplexing and channel coding (Release 10)," 3GPP TS 36.212 V10.5.0, Mar. 13, 2012, Lte Advanced, 79 pages.
3GPP, "Technical Specification Group Radio Access Network; Evolved Universal Terrestrial Radio Access (E-UTRA); Physical layer procedures (Release 10)," 3GPP TS 36.213 V10.5.0, Lte Advanced, Mar. 13, 2012, 125 pages.
3GPP, "Technical Specification Group Radio Access Network; Evolved Universal Terrestrial Radio Access (E-UTRA); Physical Channels and Modulation (Release 10)," 3GPP TS 36.211 V10.5.0, Lte Advanced, Jun. 26, 2012, 101 pages.
International Search Report and Written Opinion for International Application No. PCT/US2013/026604, mailed on Jun. 3, 2013.
Mediatek Inc., "Discussion on HARQ feedback mechanism and cross-carrier scheduling in inter-band CA with different TDD-UL-DL configurations," R1-113864. 3GPP TSG RAN WG1 #67, San Francisco, USA, Nov. 14-18, 2011.
Hauwei et al., "HARQ timing design to TDD inter-band CA with different UL-DL configurations", R1-114088, 3GPP TSG RAN WG1 #67, San Francisco, USA, Nov. 14-18, 2011.
Catt, "Corrections on HARQ-ACK codebook size determination," R1-112559, 3GPP TSG-RAN WG1 Meeting #66, Athens, Greece, Aug. 22-26, 2011.
CMCC, "Detail on support of different TDD-UL-DL configurations on different bands," R1-114192, 3GPP TSG RAN WG1 #67, San Francisco, USA, Nov. 14-18, 2011.
Final Office Action issued Feb. 16, 2015 from Swedish Application No. 1350307-3.
Office Action issued Jan. 26, 2015 from Russian Application No. 2014139406.
Office Action issued Mar. 2, 2015 from Finnish Application No. 20135235.
"3GPP et al., "Evolved Universal Terrestrial Radio Access (E-UTRA);Physical layer procedures (3GPP TS 36.213 version 10.5.0 Release 10)," ETSI TS 136 213 V10.5.0 (Mar. 2012), Lte Advanced, 127 pages".
Office Action issued Apr. 28, 2015 from Taiwan Application No. 102104851, 5 pages.
Office Action issued Jun. 18, 2015 from Australian Patent Application No. 2013232618, 6 pages.
Extended European Search Report issued May 13, 2015 from European Divisional Patent Application No. 15151505.3, 11 pages.
Nokia Siemens Networks et al., "Remaining Issues on HARQ-ACK on PUCCH/PUSCH for inter-band CA with different TDD configurations on different bands," 3GPP TSG-RAN WG1 Meeting #70, R1-123635, Agenda Item: 7.2.3, Aug. 13-17, 2012, Qingdao, China, 6 pages.
Ericsson et al., "HARQ-ACK transmission with PUCCH Format 3 in aggregation of TDD carriers with different UL/ DL configurations," 3GPP TSG-RAN WG1 #70, R1-123609, Agenda Item: 7.2.3, Aug. 13-17, 2012, Qingdao, China, 4 pages.

(56) References Cited

OTHER PUBLICATIONS

LG Electronics, "ACK/NACK transmission for TDD CA with different UL-DL configurations," 3GPP TSG RAN WG1#70, R1-123508, Aug. 13-17, 2012, Qingdao, China, 8 pages.

LG Electronics, "Individual ACK/NACK support in TDD when PUCCH format 3 is configured," 3GPP TSG RAN WG1 Meeting #67, R1-113972, Agenda Item: 7.2.1.2, Nov. 14-18, 2011, San Francisco, USA, 2 pages.

Office Action issued Oct. 6, 2015 from Japanese Patent Application No. 2015-500437.

Office Action issued Sep. 6, 2015 from Chinese Patent Application No. 201310083146.2.

Extended European Search Report issued Oct. 29, 2015 from European Patent Application No. 13760993.9.

Office Action issued Sep. 9, 2015 from Taiwan Divisional Application No. 103143030.

* cited by examiner

HARQ/ACK CODEBOOK SIZE DETERMINATION

CROSS REFERENCE TO RELATED APPLICATIONS

The present application claims priority to U.S. application Ser. No. 13/593,044, filed Aug. 23, 2012, entitled "HARQ/ACK CODEBOOK SIZE DETERMINATION," which claims priority to U.S. Provisional Patent Application No. 61/612,188, filed Mar. 16, 2012, entitled "WIRELESS COMMUNICATION SYSTEMS AND METHODS." The entire disclosures of which are hereby incorporated by reference.

FIELD

Embodiments of the present invention relate generally to the field of communications, and more particularly, to determining size of a hybrid automatic repeat request-acknowledgment (HARQ-ACK) codebook in wireless communication networks.

BACKGROUND

Release 8 of the Third Generation Partnership Project (3GPP) Long-Term Evolution (LTE) standard describes piggybacking uplink control information (UCI) on a physical uplink shared channel (PUSCH). The channel quality indicator/pre-coding matrix indicator (CQI/PMI) resources are placed at the beginning of uplink shared channel (UL-SCH) data resources and mapped sequentially to all single-carrier frequency division multiple access (SC-FDMA) symbols on one subcarrier before continuing on the next subcarrier. The UL-SCH data is rate-matched around the CQI/PMI data. The HARQ-ACK resources are mapped to SC-FDMA symbols by puncturing the PUSCH data resource elements (REs). Reducing the PUSCH REs punctured by the HARQ-ACK symbols would, therefore, improve the PUSCH performance.

In light of the above, Release 8 provides a 2-bit downlink assignment Index (DAI) in downlink control information (DCI) format 0/4, $V_{DAI}^{UL}$, which is used to indicate total number of downlink (DL) assignments in a bundling window. Assuming the bundling window size is M, only $V_{DAI}^{UL}$ HARQ-ACK bits, rather than M bits, need to be fed back to a transmitting device, e.g., an enhanced node base station (eNB), if PUSCH transmission is adjusted based on a detected PDCCH with DCI format 0/4. Thus, $(M-V_{DAI}^{UL})$ useless HARQ-ACK bits, corresponding to DL subframes that were not scheduled by the eNB, are reduced.

Release 10 of the LTE standard (Rel-10) introduces carrier aggregation, in which more than one component carrier (CC) may be used for data transmissions. In a Release 10 time division duplexing (TDD) system, the HARQ-ACK codebook size, in case of piggybacking on PUSCH, is determined by the number of CCs, their configured transmission mode, and number of downlink subframes in bundled window. For TDD UL-DL configurations 1-6, and when PUCCH format 3 is configured for transmission of HARQ-ACK, the HARQ-ACK codebook size is determined by:

$$n_{HARQ} = B_c^{DL}(C+c_2), \quad (1)$$

where C is the number of configured CCs, $C_2$ is the number of CCs configured with a multiple-input, multiple-output (MIMO) transmission mode that enables reception of two transport blocks; $B_c^{DL}$ is the number of downlink subframes for which UE needs to feedback HARQ-ACK bits for the $c^{th}$ serving cell. For TDD UL-DL configuration 1, 2, 3, 4, and 6, the UEs will assume $B_c^{DL}$ on PUSCH subframe n as:

$$B_c^{DL} = W_{DAI}^{UL}, \quad (2)$$

where $W_{DAI}^{UL}$ is determined by the DAI in DCI format 0/4 according to the following table:

TABLE 1

| DAI MSB, LSB | $W_{DAI}^{UL}$ |
| --- | --- |
| 0, 0 | 1 |
| 0, 1 | 2 |
| 1, 0 | 3 |
| 1, 1 | 4 |

The DAI may be communicated in a subframe that has a predetermined association with subframe n for each serving cell. For example, the DAI may be communicated in subframe n−k', where k' is defined in the following table:

TABLE 2

| TDD UL/DL Configuration | subframe number n | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

Since the TDD UL-DL configuration of each serving cell is always identical in Rel-10 and $W_{DAI}^{UL}$ is definitely no larger than the bundling window size, the HARQ-ACK codebook size determined by $W_{DAI}^{UL}$ is always equal to minimum HARQ-ACK bits number and is the best tradeoff between HARQ-ACK overhead and performance.

In Release 11 of the 3GPP LTE standard, interband CA of TDD with CCs having different UL-DL configurations for each serving cell is supported. Having different UL-DL configurations in the different serving cells may result in different HARQ-ACK bundling windows. Therefore, the UL grant based HARQ-ACK codebook size determination in previous releases may not effectively reduce the HARQ-ACK overhead.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
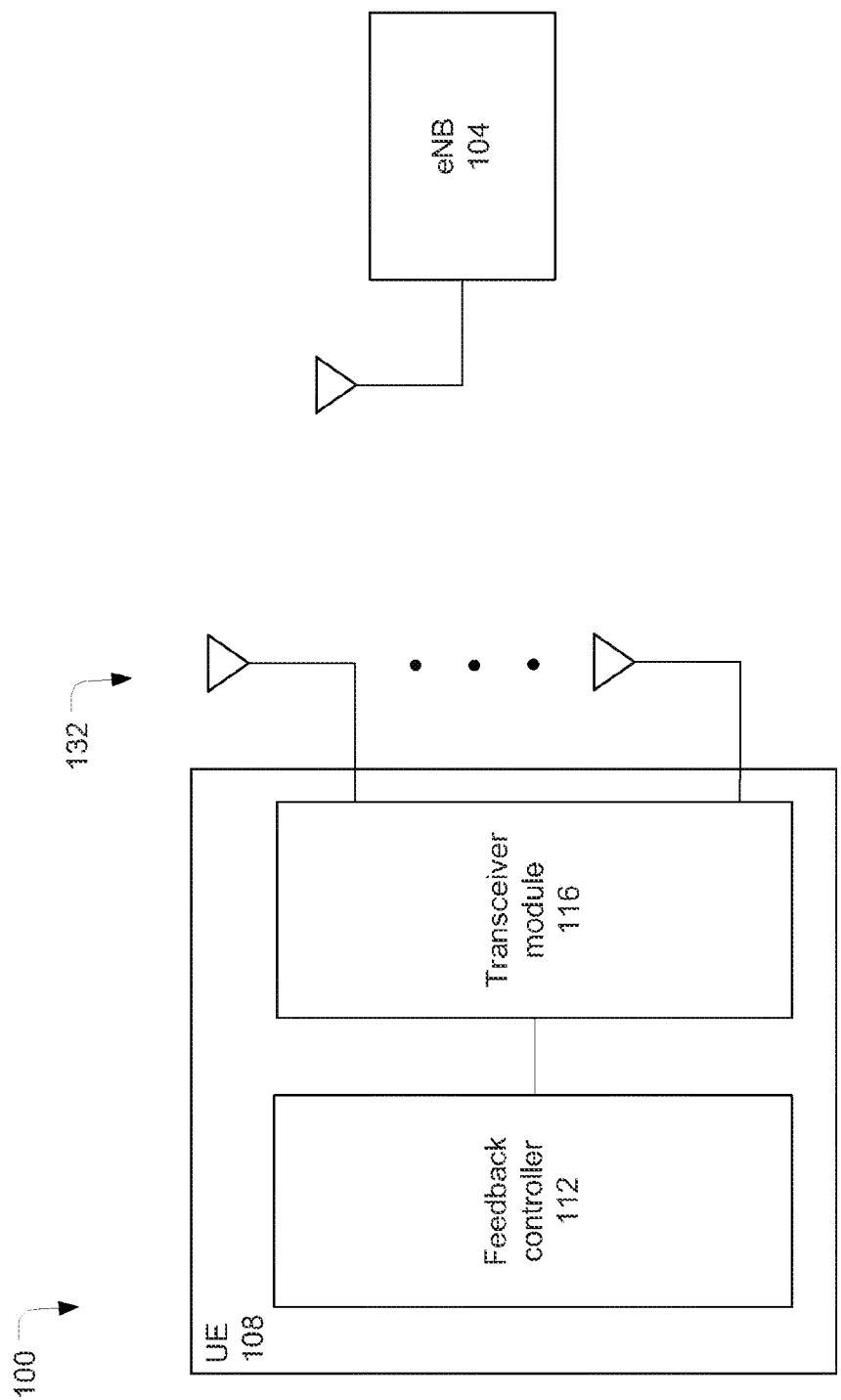
FIG. 1 schematically illustrates a wireless communication network in accordance with various embodiments.

Illustrative embodiments of the present disclosure include, but are not limited to, methods, systems, computer-readable media, and apparatuses for determining a size of a HARQ-ACK codebook in wireless communication networks. Various embodiments may provide user equipment (UE) that operate in conformance with Release 11 of 3GPP LTE (hereinafter "Rel-11") (and later releases) with the ability to determine HARQ-ACK codebook size on PUSCH in a manner to reduce HARQ-ACK overhead while maintaining HARQ-ACK performance for interband CA of TDD CCs with different UL-DL configurations for different serving cells. In this manner, described UEs may adaptively determine the desired HARQ-ACK codebook size to puncture the PUSCH REs that will reduce negative impact on the PUSCH with little to no additional overhead.

Various embodiments may be described with reference to specific configurations, e.g., TDD UL-DL configurations and special subframe configurations; formats, e.g., DCI formats; modes, e.g., transmission modes; etc. These configurations, formats, modes, etc., may be defined consistent with presently published LTE documents, e.g., Rel-10 and/or Rel-11 technical specifications.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group), combinational logic circuit, or other electronic circuit that provides the described functionality. In various embodiments, the module may execute instructions stored in one or more computer-readable media to provide the described functionality.

FIG. 1 schematically illustrates a wireless communication network 100 in accordance with various embodiments. Wireless communication network 100 (hereinafter "network 100") may be an access network of a 3GPP LTE network such as evolved universal terrestrial radio access network (E-UTRAN). The network 100 may include a base station, e.g., enhanced node base station (eNB) 104, configured to wirelessly communicate with user equipment (UE) 108.

As shown in FIG. 1, the UE 108 may include feedback controller 112 coupled with transceiver module 116. The transceiver module 116 may be further coupled with one or more of a plurality of antennas 132 of the UE 108 for communicating wirelessly with other components of the network 100, e.g., eNB 104.

In some embodiments, the UE 108 may be capable of utilizing carrier aggregation (CA) in which a number of component carriers (CCs) are aggregated for communication between the eNB 104 and the UE 108. The transceiver module 116 may be configured to communicate with the eNB 104 via a plurality of serving cells utilizing a respective plurality of CCs. The CCs may be disposed in different bands and may be associated with different TDD UL-DL configurations (hereinafter also referred to as "UL-DL configurations"). Thus, in some embodiments, at least two serving cells may have different UL-DL configurations.

Table 3 below shows example UL-DL configurations that may be employed in various embodiments of the present invention.

TABLE 3

| TDD UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 3, D is a subframe for a downlink transmission, U is a subframe for an uplink transmission, and S is a special subframe used, e.g., for a guard time. In some embodiments, a special subframe may include three fields: downlink pilot time slot (DwPTS), which may include the DCI, guard period (GP), and uplink pilot time slot (UpPTS)

In an initial connection establishment, the UE 108 may connect with a primary serving cell (PCe11) of the eNB 104 utilizing a primary CC, which may also be referred to as $CC_0$. This connection may be used for various functions such as security, mobility, configuration, etc. Subsequently, the UE 108 may connect with one or more secondary serving cells (SCells) of the eNB 104 utilizing one or more secondary CCs. These connections may be used to provide additional radio resources.

Figure 2:
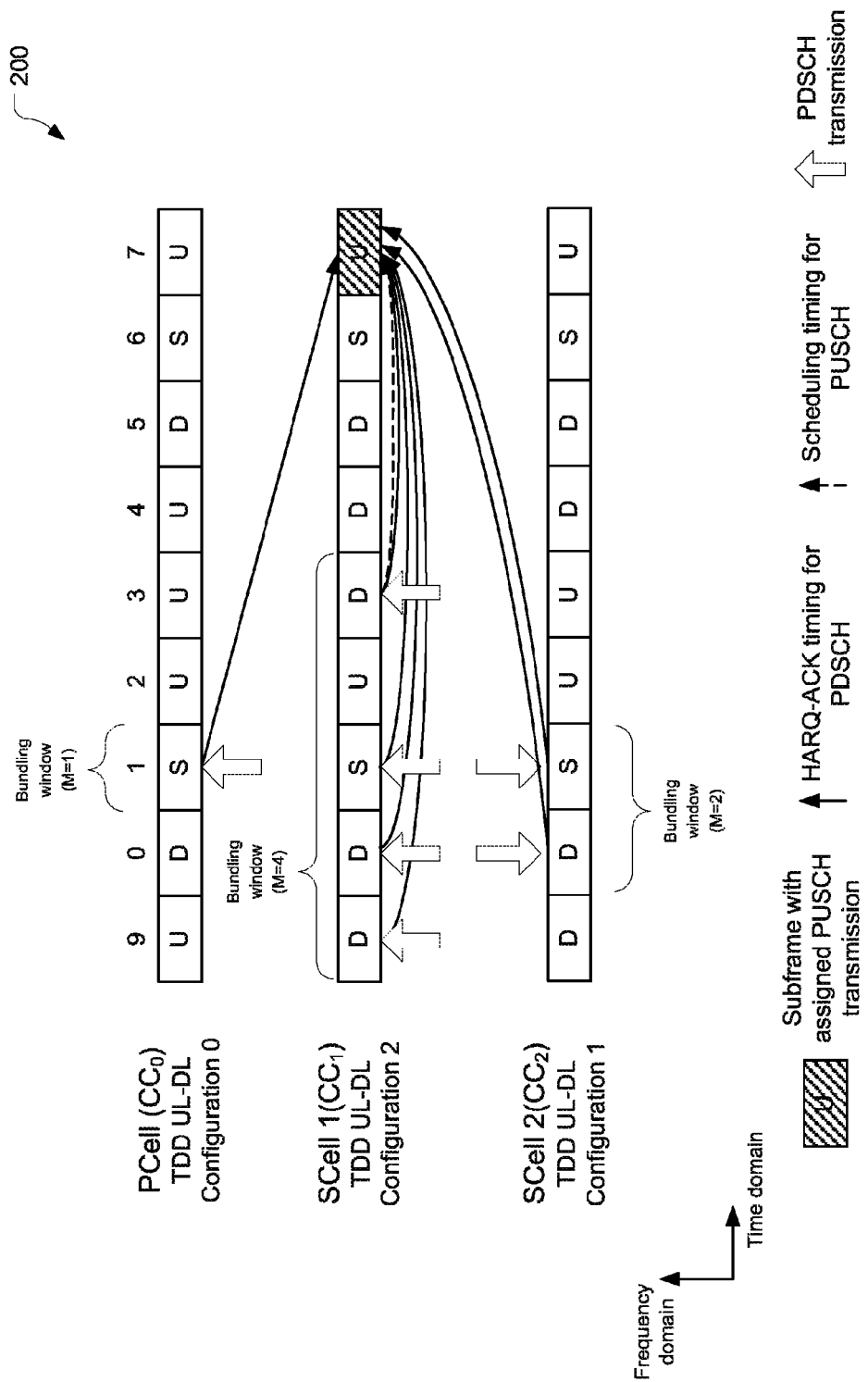
FIG. 2 illustrates an example TDD communication structure with HARQ-ACK timing information in accordance with various embodiments.

FIG. 2 illustrates an example TDD communication structure 200 with HARQ-ACK timing information in accordance with an embodiment. In the TDD communication structure 200, three serving cells may be configured for communication between the eNB 104 and the UE 108. For example, a PCell having UL-DL configuration 0, an SCell 1 having UL- DL configuration 2, and an SCell 2 having UL-DL configuration 1. In other embodiments, other number of serving cells may be configured for communication between the eNB 104 and the UE 108.

In the TDD communication structure 200, the PCell may have a bundling window, $M_0$, that includes one subframe that may include downlink transmissions, e.g., PDSCH transmissions or PDCCH transmissions indicating downlink semi-persistent scheduling (SPS) release, for which corresponding HARQ-ACK information is to be transmitted as a PUSCH transmission in an associated uplink subframe, e.g., subframe 7 of the SCell 1. The SCell 1 may have a bundling window, $M_1$, that includes four subframes that may include downlink transmissions for which corresponding HARQ-ACK information is to be transmitted as a PUSCH transmission in an associated uplink subframe, e.g., subframe 7 of the SCell 1. The SCell 2 may have a bundling window, $M_2$, that includes two subframes that may include downlink transmissions for which corresponding HARQ-ACK information is to be transmitted as a PUSCH transmission in an associated uplink subframe, e.g., subframe 7 of the SCell 1. The association between the DL subframes of the respective bundling windows and the UL subframe that will be used to transmit the corresponding HARQ-ACK information may be based on a predetermined HARQ timing reference. An example of such HARQ timing references is shown and discussed below with respect to Table 4.

In the example shown in FIG. 2, all of the subframes capable of carrying downlink transmissions for which corresponding HARQ-ACK information is to be transmitted are shown as having PDSCH transmissions. However, in other embodiments, the eNB may not schedule downlink transmissions on one or more of these subframes.

Figure 3:
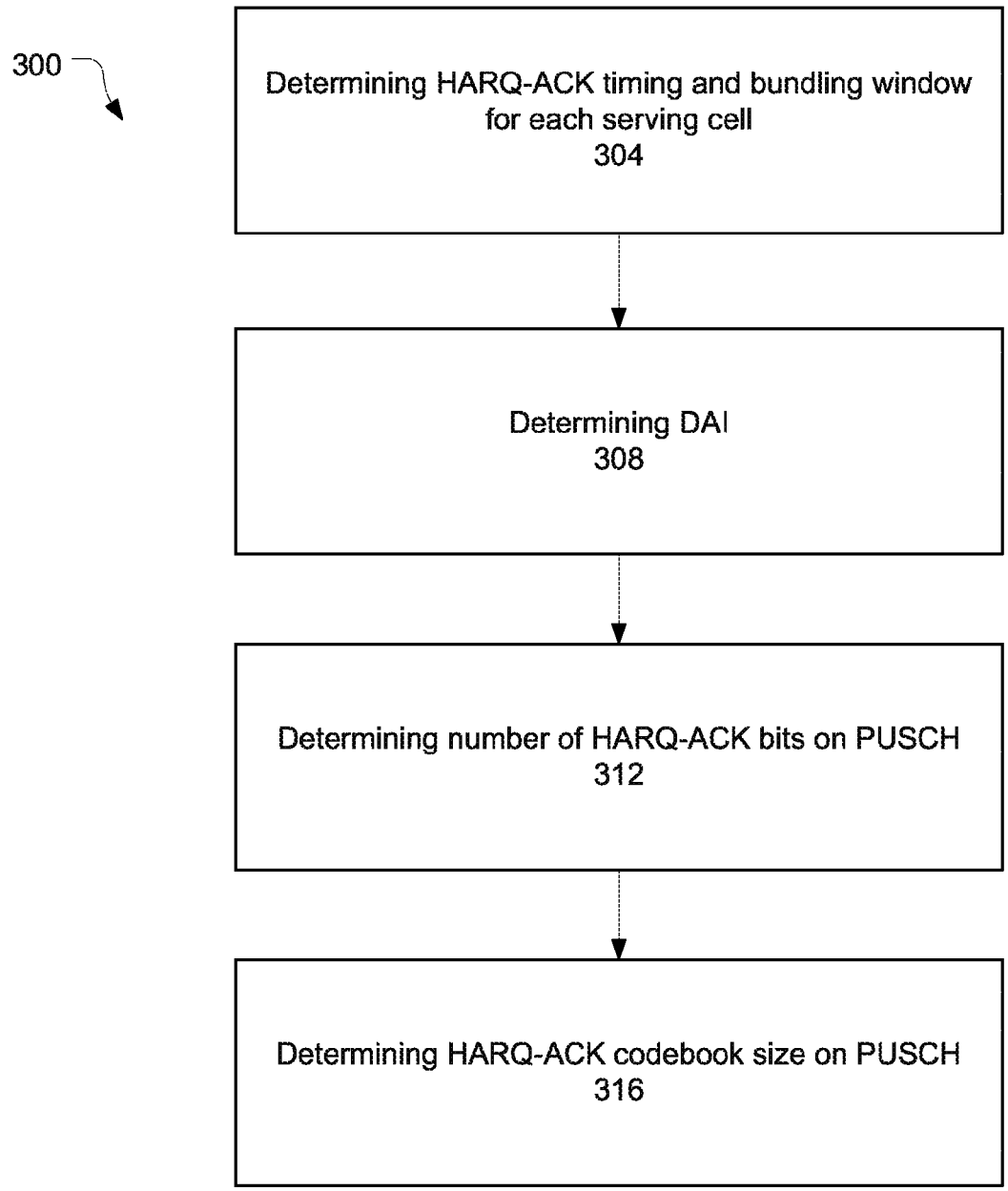
FIG. 3 is a flowchart illustrating a method of determining a HARQ-ACK codebook size that may be performed by a user equipment in accordance with various embodiments.

FIG. 3 illustrates a method 300 of determining a HARQ-ACK codebook size in accordance with some embodiments. Method 300 may be performed by a feedback controller of a UE, e.g., feedback controller 112 of UE 108. In some embodiments, the UE may include and/or have access to one or more computer-readable media having instructions stored thereon, that, when executed, cause the UE, or feedback controller, to perform the method 300.

At 304, the feedback controller may determine the HARQ-ACK timing and bundling window for each configured serving cell. In some embodiments, the feedback controller may determine, for each configured serving cell, a total number of subframes within a bundling window that is associated with an uplink subframe. In general, the HARQ-ACK bundling window may include both downlink subframes and special subframes, as both are capable of carrying PDSCH transmissions. However, in some embodiments, certain special subframes may be excluded from the bundling window in order to reduce HARQ-ACK codebook size. For example, in special subframes of configurations 0 and 5 with normal downlink cyclic prefix (CP) or configurations 0 and 4 with extended downlink CP may be excluded from the bundling window as they typically do not carry PDSCH transmissions. The special subframe configurations may be defined consistent with Table 4.2-1 of 3GPP Technical Specification (TS) 36.211 V 10.5.0 (2012-06).

In some embodiments, the HARQ-ACK timing and bundling windows, $M_c$, may be determined according to a predetermined downlink association set index K: $\{k_0, k_1, \ldots k_{M-1}\}$ for TDD as illustrated in the UL-DL configurations for HARQ timing reference of Table 4.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In various embodiments, each serving cell may have a HARQ timing reference that is the same or different from the UL-DL configuration of the serving cell. The UL-DL configuration of the serving cell is communicated in the serving cell's System Information Block (SIB) 1 and, therefore, may also be referred to as the serving cell's SIB1 configuration. The HARQ timing reference of a PCell may be the same as the PCell's SIB1 configuration, while a HARQ timing reference of an SCell may be selected by considering both the SCell's SIB1 configuration and the PCell's SIB1 configuration according to Table 5.

TABLE 5

| UL-DL configuration for HARQ timing reference | SCell SIB1 UL-DL configuration | | | | | | |
|---|---|---|---|---|---|---|---|
| | | 0 | 1 | 2 | 3 | 4 | 5 | 6 |
| PCell SIB1 UL-DL configuration | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

According to Table 5, and with reference to FIG. 2, the PCell will use UL-DL configuration 0 for its HARQ timing reference, SCell 1 will use UL-DL configuration 2 for its HARQ timing reference, and SCell will use UL-DL configuration 1 for its HARQ timing reference. While this embodiment illustrates both SCells using their SIB1 configurations for HARQ timing reference, an SCell may use other UL-DL configurations for its HARQ timing reference in other embodiments. For example, if SCell 1 had a SIB1 configuration of 3 and the PCell had a SIB1 configuration of 1, the SCell would use UL-DL configuration 4 for its HARQ timing reference.

To further illustrate use of Tables 4 and 5, consider the following. With subframe 7 (e.g., n=7) of the SCell 1 being designated as the uplink subframe for transmitting HARQ-ACK information, the associated downlink subframes may be determined by n−k, where k∈K. The size of the bundling window, $M_c$, is the cardinality of the set K of elements, and the specific subframes of the bundling window are determined by n−$k_0$, . . . n−$k_{M-1}$. So, the size of the bundling window of the PCell, $M_0$, is 1 (given that only one element is associated with UL-DL configuration 0, subframe n=7 in Table 4), and the downlink subframe of $M_0$ is 7−6=1, e.g., DL subframe 1. The size of the bundling window of SCell 1, $M_1$, is 4 (given four elements of Table 4) and the DL subframes of $M_1$ are subframe 3 (7−4), subframe 1 (7−6), subframe 0 (7−7), and subframe 9 of previous frame (7−8). The size of the bundling window of SCell 2, $M_2$, is 2 (given two elements of Table 4) and the DL subframes of $M_2$ are subframe 0 (7−7) and subframe 1 (7−6).

At 308, the feedback controller may determine a DAI. The DAI may be communicated in a subframe that has a predetermined association with the uplink subframe, n, that will carry the HARQ-ACK information for the bundling windows, e.g., subframe 7 in SCell 1. In some embodiments, the DAI may be communicated in subframe n−k', where k' is defined in Table 2. In some embodiments, the DAI may be used to determine $W_{DAI}^{UL}$ according to Table 1. $W_{DAI}^{UL}$ may correspond to a maximum value of number of scheduled downlink subframes within bundling windows of the plurality of serving cells. With reference to FIG. 2, $W_{DAI}^{UL}=4$ because 4 downlink subframes are scheduled in SCell 1.

At 312, the feedback controller may determine a number of HARQ-ACK bits, which correspond to the configured serving cells, on a PUSCH of the uplink subframe. In some embodiments, the feedback controller may determine the number of HARQ-ACK bits, for each serving cell, based on the $W_{DAI}^{UL}$, which is based on the DAI for uplink resource allocation, and the number of subframes of the bundling window of the corresponding serving cell according to the HARQ timing reference configuration.

In some embodiments, the number of HARQ-ACK bits for the $c^{th}$ serving cell, $O_c$, may be determined by the following equation.

$$O_c = \text{Min}\left(M_c^{DL}, W_{DAI}^{UL} + 4\left\lceil\frac{(U - W_{DAI}^{UL})}{4}\right\rceil\right) * C_c^{DL}, \quad \text{Equation 1}$$

where U is a maximum value of $U_c$ among all configured serving cells, $U_c$ is the total number of subframes with received transmissions (e.g., PDSCHs and PDCCHs indicating downlink SPS release) in bundling window (e.g., subframe(s) n−k where k∈K as described with respect to Table 4) of the $c^{th}$ serving cell, $W_{DAI}^{UL}$ is determined by the DAI included in DCI, which may have format 0 or 4, that allocates uplink transmission resource of the serving cell in which the UCI piggybacking on the PUSCH (e.g., SCell 1) according to Table 1 in subframe n−k', where k' is defined in Table 2; $C_c^{DL}=1$ if transmission mode configured in the $c^{th}$ serving cell supports one transport block and $C_c^{DL}=2$ otherwise; and Min(X,Y)=X if X≤Y, and Min(X,Y)=Y otherwise.

In embodiments in which none of the plurality of aggregated serving cells include a configuration 5 as a HARQ timing reference configuration, $W_{DAI}^{UL}$ will be at least as large as U, thereby canceling out the $$4\left\lceil\frac{(U - W_{DAI}^{UL})}{4}\right\rceil$$

term of Equation 1. Thus, Equation 1 is reduced to:

$$O_c = \text{Min}(M_c^{DL}, W_{DAI}^{UL}) * C_c^{DL}. \quad \text{Equation 2}$$

Thus, in some embodiments, Equation 2 will be used for HARQ-ACK transmission in an UL subframe n and on the PUSCH adjusted by its associated UL grant with $W_{DAI}^{UL}$ if none of the HARQ timing reference configurations of the aggregated serving cells is configuration 5, and Equation 1 will be used for HARQ-ACK transmission in an UL subframe n and on the PUSCH adjusted by its associated UL grant with $W_{DAI}^{UL}$ if the HARQ timing reference configuration of any of the aggregated serving cells is configuration 5.

It may be noted that in some embodiments, neither Equation 1 or 2 may be used in situations in which the serving cell that performs the PUSCH scheduling (e.g., SCell 1 in FIG. 2) has a SIB1 configuration 0. In these embodiments, the eNB may not be able to transmit DAI in DCI format 0/4 and, therefore, the UE will not be able to determine W.

The HARQ-ACK feedback bits $O_{c,0}^{ACK}$, $O_{c,1}^{ACK}$, . . . $O_{c,O_c}^{ACK}$ for the $c^{th}$ serving cell are constructed as follows, where c≥0: the HARQ-ACK for a PDSCH transmission associated with a DCI message of a PDDCH or a PDCCH transmission indicating downlink SPS release in subframe n−k is associated with $O_{c,DAI(k)-1}^{ACK}$ if transmission mode configured in the $c^{th}$ serving cell supports one transport block, or associated with $O_{c,DAI(k)-2}^{ACK}$ and $O_{c,DAI(k)-1}^{ACK}$ otherwise, where DAI(k) is the value of DAI, for resource allocation of downlink subframe, in DCI format 1A/1B/1D/1/2/2A/2B/2C detected in subframe n−k depending on the bundling window in the $c^{th}$ serving cell. The HARQ-ACK feedback bits without any detected PDSCH transmission or without detected PDCCH indicating downlink SPS release may be set to NACK.

An example is provided below, with reference to FIG. 2 and assuming transmission mode 4 with two transport blocks enabled is configured. The special subframe configuration of each CC is configuration 3 with normal downlink cyclic prefix (CP). As stated above, the eNB, in this example, may transmit at each opportunity within the designated bundling windows, e.g., subframe 1 of PCell, subframes 9, 0, 1, and 3 of SCell 1, and subframes 0 and 1 of SCell 2. Further, the UE may receive, in subframe 3 of the SCell 1, the uplink grant for the PUSCH transmission at subframe 7 of the SCell 1. Since the maximum value of total number of PDSCH scheduled subframes within the bundling windows is 4 according to present assumptions, the $W_{DAI}^{UL}$ of uplink grant for subframe 7 shall be set as 4 by the eNB. According to Equation 1, the $O_0$ value of HARQ-ACK bits for PCell may be calculated as follows $$O_0 = \text{Min}\left(1, 4 + 4\left\lceil\frac{(4-4)}{4}\right\rceil\right) * 2 = 2.$$

Figure 4:
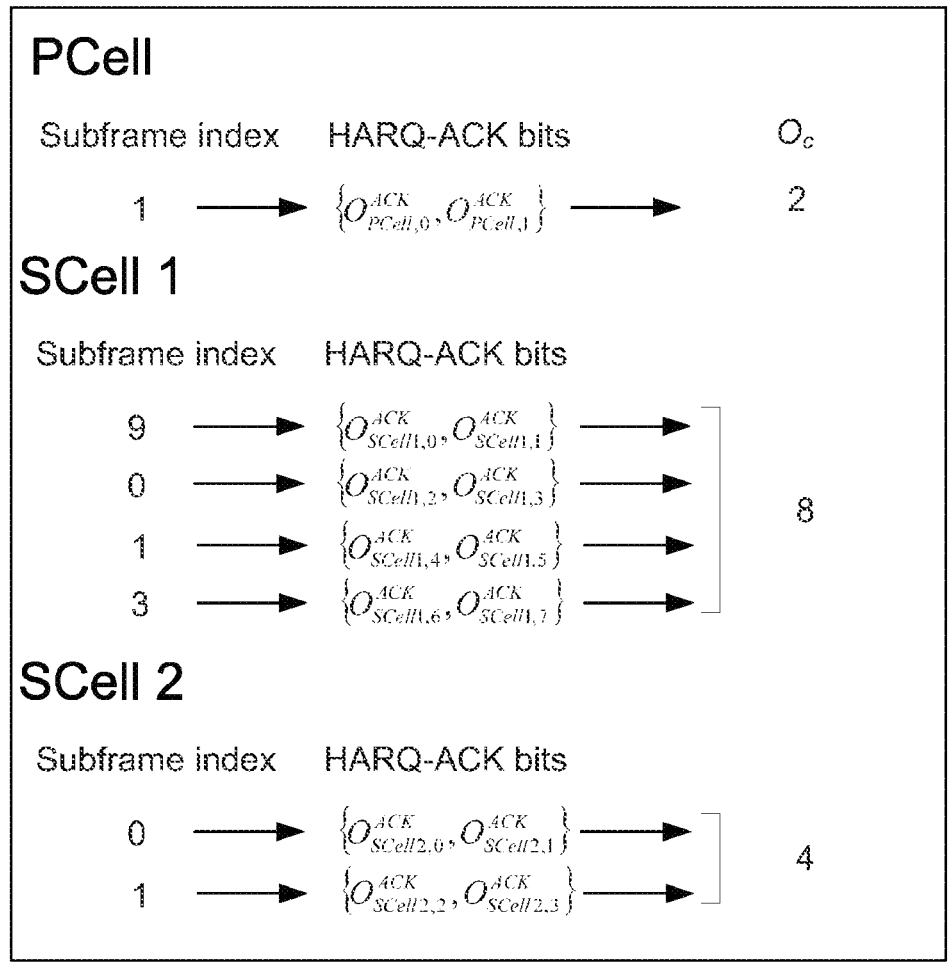
FIG. 4 is a HARQ-ACK bits generation table in accordance with some embodiments.

In the same manner, the HARQ-ACK bits for SCell 1 and SCell 2 may be determined as $O_1=8$ and $O_2=4$, respectively. This is shown, graphically, in HARQ-ACK bits generation table 400 of FIG. 4 in accordance with some embodiments. Were the HARQ-ACK bits determined according to the Rel-10 methodology, the results would be $O_0=8$, $O_1=8$ and $O_2=8$.

At 316, the feedback controller may determine the HARQ-ACK codebook size on the PUSCH of the uplink subframe. The determination of the HARQ-ACK codebook size may be done by aggregating the number of HARQ-ACK bits that corresponds to each of the plurality of serving cells according to the following equation, $$O = \sum_{c=0}^{N_{Cells}^{DL}-1} O_c.\qquad\text{Equation 2}$$

In the above discussed example, O=14. In the Rel-10 methodology, O=24. Thus, the described embodiments result in a 42% reduction in HARQ-ACK overhead. In this manner, the PUSCH performance and system throughput may be improved without impacting HARQ-ACK performance.

Figure 5:
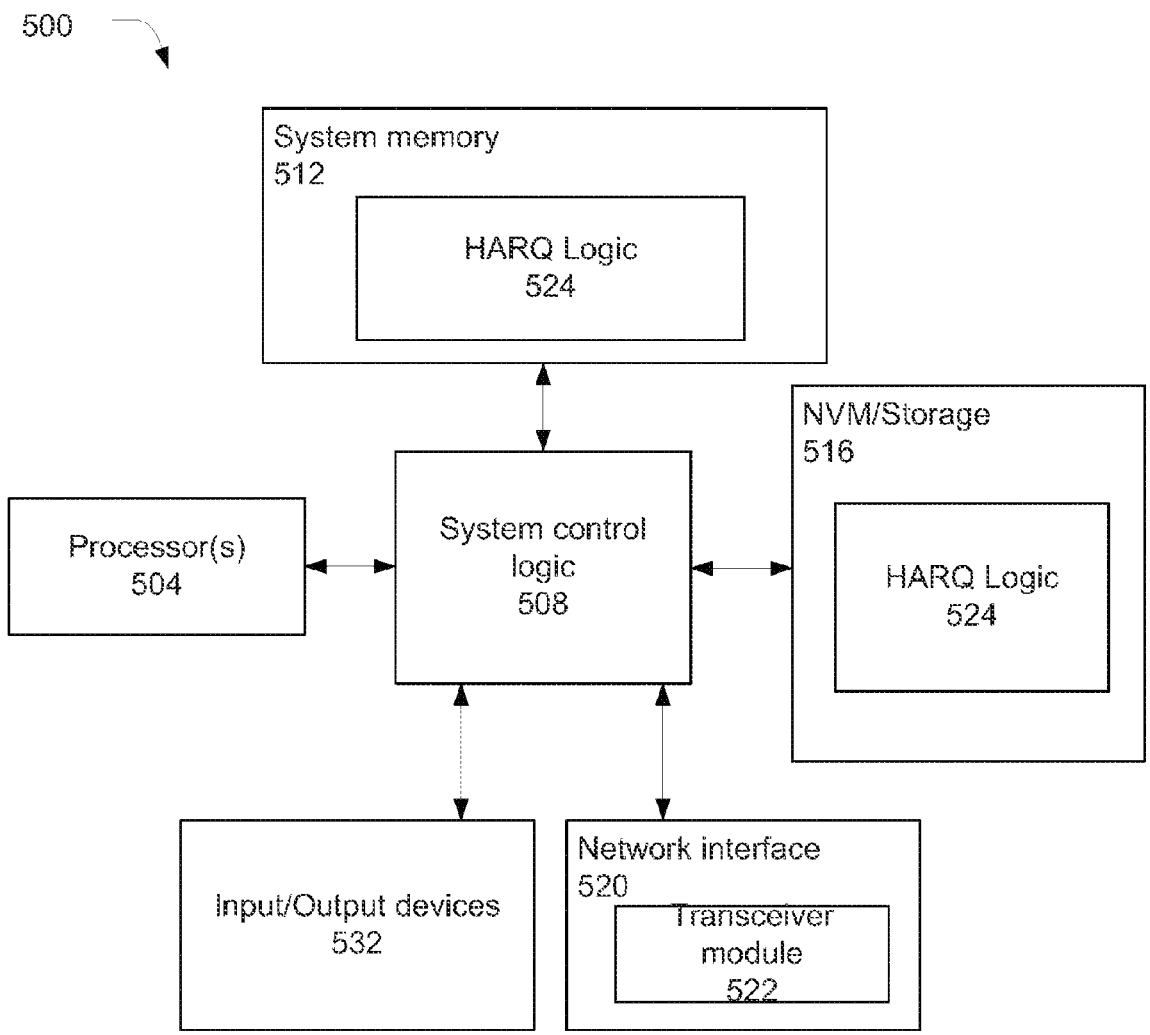
FIG. 5 schematically depicts an example system in accordance with various embodiments.

The UE 108 described herein may be implemented into a system using any suitable hardware and/or software to configure as desired. FIG. 5 illustrates, for one embodiment, an example system 500 comprising one or more processor(s) 504, system control logic 508 coupled with at least one of the processor(s) 504, system memory 512 coupled with system control logic 508, non-volatile memory (NVM)/storage 516 coupled with system control logic 508, a network interface 520 coupled with system control logic 508, and input/output (I/O) devices 532 coupled with system control logic 508.

The processor(s) 504 may include one or more single-core or multi-core processors. The processor(s) 504 may include any combination of general-purpose processors and dedicated processors (e.g., graphics processors, application processors, baseband processors, etc.).

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions for system 500. In some embodiments, the system memory 512 may include HARQ logic 524 that, when executed, cause a feedback controller to perform the various operations described herein. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example, HARQ logic 524. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520 and/or over Input/Output (I/O) devices 532.

Network interface 520 may have a transceiver module 522, similar to transceiver module 116, to provide a radio interface for system 500 to communicate over one or more network(s) and/or with any other suitable device. In various embodiments, the transceiver module 522 may be integrated with other components of system 500. For example, the transceiver module 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a multiple input, multiple output radio interface. Network interface 520 for one embodiment may include, for example, a wired network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

In various embodiments, the I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be an eNB or a mobile computing device such as, but not limited to, a laptop computing device, a tablet computing device, a netbook, a smartphone, etc. In various embodiments, system 500 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. One or more non-transitory computer-readable media having instructions, stored thereon, that when executed cause a user equipment (UE) to:
   identify time division duplexing (TDD) uplink-downlink (UL-DL) configurations for individual serving cells of a plurality of serving cells, wherein at least two of the individual serving cells have different TDD UL-DL configurations;
   obtain a downlink assignment index (DAI);
   determine a value based on the DAI; and for a first serving cell of the plurality of serving cells:
  determine a number of downlink subframes or special subframes that are included in a bundling window associated with an uplink subframe;
  compare the determined value with the determined number of downlink subframes or special subframes included in the bundling window; and
  select, based on the comparison, the lesser of the determined value or the determined number of downlink subframes or special subframes included in the bundling window to correspond to a number of subframes for which the UE needs to feedback hybrid automatic repeat request-acknowledgement (HARQ-ACK) bits for the first serving cell.

2. The one or more media of claim 1, wherein the instructions, when executed, further cause the UE to, for the first serving cell:
  determine a number of HARQ-ACK bits to be transmitted in the uplink subframe based on the number of downlink subframes for which the UE needs to feedback HARQ-ACK bits for the individual serving cell and based on a number of transport blocks supported per downlink subframe in a transmission mode of the first serving cell.

3. The one or more media of claim 2, wherein the instructions, when executed, further cause the UE to determine, based on the determined number of HARQ-ACK bits to be transmitted in the uplink subframe for the first serving cell, a total number of HARQ-ACK bits associated with a codebook of the plurality of serving cells.

4. The one or more media of claim 3, wherein the instructions, when executed, further cause the UE to:
  puncture physical uplink shared channel (PUSCH) resource elements of the uplink subframe with the determined total number of HARQ-ACK bits.

5. The one or more media of claim 1, wherein the UE is to select the lesser of the determined value or the determined number of downlink subframes to correspond to the number of downlink subframes for which the UE needs to feedback HARQ-ACK bits for the first serving cell responsive to a determination that the UL/DL configuration of all of the serving cells is one of configuration 0, 1, 2, 3, 4, or 6.

6. The one or more media of claim 5, wherein the instructions, when executed, further cause the UE to, responsive to a determination that the UL/DL configuration of at least one of the serving cells is configuration 5, determine the number of downlink subframes for which the UE needs to feedback HARQ-ACK bits for the first serving cell based on:

$$B_c^{DL}=\min(W_{DAI}^{UL}+4\lfloor(U-W_{DAI}^{UL})/4\rfloor,M_c),$$

where $B_c^{DL}$ is the number of downlink subframes for which the UE needs to feedback HARQ-ACK bits for serving cell c, $W_{DAI}^{UL}$ is the value that corresponds to the DAI, U is a maximum value of $U_c$ among the plurality of serving cells, $U_c$ is a number of received physical downlink shared channels (PDSCHs) and physical downlink control channels (PDCCHs) indicating downlink semi-persistent scheduling (SPS) release for serving cell c, and $M_c$ is the number of downlink subframes or special subframes for the individual serving cell that are included in the bundling window associated with the uplink subframe.

7. The one or more media of claim 1, wherein the value determined based on the DAI corresponds to a maximum value of a number of scheduled downlink subframes within bundling windows of the plurality of serving cells.

8. The one or more media of claim 1, wherein the plurality of serving cells include a primary serving cell (PCell) and a secondary serving cell (SCell), and wherein the instructions, when executed, further cause the UE to:
  determine a HARQ timing reference configuration for the SCell based on the UL-DL configuration of the PCell and the UL-DL configuration of the SCell.

9. The one or more media of claim 8, wherein the DL-reference configuration for the SCell is different from the UL-DL configuration of the SCell.

10. The one or more media of claim 1, wherein the DAI is included in downlink control information (DCI) that allocates an uplink transmission resource of a serving cell associated with the uplink subframe, and wherein the DCI has a format that is DCI format 0 or DCI format 4.

11. An apparatus to be employed by a user equipment (UE), the apparatus comprising:
  transceiver circuitry to communicate via a plurality of configured serving cells, wherein at least two of the serving cells have different time division duplexing (TDD) uplink-downlink (UL-DL) configurations; and
  a feedback controller coupled with the transceiver circuitry, the feedback controller to:
    receive downlink control information (DCI) that allocates resources of an uplink subframe associated with a first serving cell of the plurality of configured serving cells, wherein the DCI includes a downlink assignment index (DAI);
    determine a value based on the DAI;
    determine a number of downlink subframes or special subframes, for a second serving cell of the plurality of configured serving cells, that are included in a bundling window associated with the uplink subframe;
    compare the determined value with the determined number of downlink subframes or special subframes included in the bundling window; and
    select, based on the comparison, the lesser of the determined value or the determined number of downlink subframes or special subframes included in the bundling window to correspond to a number of downlink subframes for which the UE is to feedback hybrid automatic repeat request-acknowledgement (HARQ-ACK) bits for the second serving cell.

12. The apparatus of claim 11, wherein the feedback controller is further to determine a number of HARQ-ACK bits for the second serving cell that are to be transmitted in the uplink subframe based on the number of subframes for which the UE is to feedback HARQ-ACK bits for the second serving cell and based on a number of transport blocks supported per downlink subframe in a transmission mode of the second serving cell.

13. The apparatus of claim 12, wherein the feedback controller is to determine a codebook size associated with the uplink subframe based on the determined number of HARQ-ACK bits for the second serving cell.

14. The apparatus of claim 12, wherein the transceiver circuitry is to puncture physical uplink shared channel (PUSCH) resource elements of the uplink subframe with the HARQ-ACK bits.

15. The apparatus of claim 11, wherein the transceiver is to select the lesser of the determined value or the determined number of downlink subframes to correspond to the number of downlink subframes for which the UE needs to feedback HARQ-ACK bits for the second serving cell is performed responsive to a determination that the UL/DL configuration of all individual serving cells of the plurality of configured serving cells is configuration 0, 1, 2, 3, 4, or 6.

16. The apparatus of claim 11, wherein the value determined based on the DAI corresponds to a maximum value of a number of scheduled downlink subframes within bundling windows of the plurality of configured serving cells.

17. The apparatus of claim 11, wherein the feedback controller is to:
determine a UL-DL configuration for the first serving cell;
determine a UL-DL configuration for the second serving cell; and
determine a HARQ timing reference configuration for the second serving cell based on the UL-DL configuration of the first serving cell and the UL-DL configuration of the second serving cell.

18. The apparatus of claim 11, further comprising a touchscreen display coupled to the apparatus.

19. One or more non-transitory computer-readable media having instructions, stored thereon, that when executed cause an evolved Node B (eNB):
transmit configuration information to a user equipment (UE) to configure the UE to communicate with the eNB over a plurality of serving cells, wherein at least two of the serving cells have different time division duplexing (TDD) uplink-downlink (UL-DL) configurations;
transmit a downlink assignment index (DAI) to the UE; and
process hybrid automatic repeat request-acknowledgement (HARQ-ACK) bits received by the eNB in an uplink subframe associated with bundling windows of the plurality of serving cells, wherein a number of the HARQ-ACK bits in the uplink subframe for a first serving cell of the plurality of serving cells is based on a comparison that yields the lesser of:
a value corresponding to the DAI; or
a number of downlink subframes or special subframes for the first serving cell that are included in the bundling window associated with the uplink subframe.

20. The one or more media of claim 19, wherein the number of the HARQ-ACK bits in the uplink subframe is further based on a number of transport blocks supported per downlink subframe for a transmission mode of the serving cells.

21. The one or more media of claim 19, wherein the uplink subframe is received by a second serving cell of the plurality of serving cells.

22. The one or more media of claim 19, wherein the DAI is included in downlink control information (DCI) that allocates resources of the uplink subframe, and wherein the DCI has a format that is DCI format 0 or DCI format 4.

23. A method to be performed by a user equipment (UE), the method comprising:
receiving configuration information for a plurality of serving cells to indicate respective time division duplexing (TDD) uplink-downlink (UL-DL) configurations for individual serving cells of the plurality of serving cells, wherein at least two of the serving cells have different TDD UL-DL configurations;
receiving a downlink assignment index (DAI) that allocates an uplink transmission resource of a serving cell associated with an uplink subframe;
determining a value based on the DAI;
determining, for a first serving cell of a plurality of serving cells, a number of downlink subframes or special subframes that are included in a bundling window associated with the uplink subframe;
comparing the determined value with the determined number of downlink subframes or special subframes included in the bundling window; and
selecting, based on the comparison, the lesser of the determined value or the determined number of downlink subframes or special subframes included in the bundling window to correspond to a number of subframes for which the UE needs to feedback hybrid automatic repeat request-acknowledgement (HARQ-ACK) bits for the first serving cell.

24. The method of claim 23, further comprising:
determining a number of HARQ-ACK bits to be transmitted in the uplink subframe for the first serving cell based on the number of downlink subframes for which the UE needs to feedback HARQ-ACK bits for the first serving cell and based on a number of transport blocks supported per downlink subframe in a transmission mode of the first serving cell; and
determining a total number of HARQ-ACK bits associated with a codebook of the plurality of serving cells based on the determined number of HARQ-ACK bits to be transmitted in the uplink subframe for the first serving cell.

25. The method of claim 23, wherein the selecting the lesser of the determined value or the determined number of downlink subframes to correspond to the number of downlink subframes for which the UE needs to feedback HARQ-ACK bits for the first serving cell is performed responsive to a determination that the UL/DL configuration of all of the serving cells is one of configuration 0, 1, 2, 3, 4, or 6.

* * * * *